United States Patent
Gallagher et al.

(10) Patent No.: US 11,254,990 B2
(45) Date of Patent: Feb. 22, 2022

(54) PHOSPHORUS ACID FUNCTIONALIZED COATING COMPOSITION

(71) Applicant: Rohm and Haas Company, Philadelphia, PA (US)

(72) Inventors: Joy A. Gallagher, Eagleville, PA (US); Philip R. Harsh, Gilbertsville, PA (US); Pu Luo, King Of Prussia, PA (US); Edwin Nungesser, Horsham, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/183,930

(22) Filed: Jun. 16, 2016

(65) Prior Publication Data

US 2016/0369359 A1   Dec. 22, 2016

Related U.S. Application Data

(60) Provisional application No. 62/181,903, filed on Jun. 19, 2015.

(51) Int. Cl.
| | | |
|---|---|---|
| *C14C 11/00* | (2006.01) | |
| *C09D 5/00* | (2006.01) | |
| *C09D 133/12* | (2006.01) | |
| *C09D 4/06* | (2006.01) | |
| *C09D 133/06* | (2006.01) | |

(52) U.S. Cl.
CPC .............. *C14C 11/003* (2013.01); *C09D 4/06* (2013.01); *C09D 5/00* (2013.01); *C09D 133/06* (2013.01); *C09D 133/12* (2013.01)

(58) Field of Classification Search
CPC .. C09D 163/00; C09D 7/1266; C09D 7/1275; C09D 7/1291; C09D 5/084; C22C 38/02; C22C 38/04; C22C 38/00; C23C 22/74; C23C 2222/20; H01F 1/18
See application file for complete search history.

(56) References Cited

U.S. PATENT DOCUMENTS

| | | | |
|---|---|---|---|
| 4,247,434 A | 1/1981 | Lovelace et al. | |
| 4,403,003 A | 9/1983 | Backhouse | |
| 6,765,049 B2 | 7/2004 | Lorah et al. | |
| 6,809,141 B2 | 10/2004 | Fasano et al. | |
| 7,071,261 B2 | 7/2006 | Devonport et al. | |
| 7,081,488 B2 | 7/2006 | Bardman et al. | |
| 7,629,414 B2 | 12/2009 | Bardman et al. | |
| 7,768,602 B2 | 8/2010 | LaFleur et al. | |
| 7,829,626 B2 | 11/2010 | Chiou et al. | |
| 2003/0005254 A1 | 1/2003 | Triece et al. | |
| 2003/0224184 A1* | 12/2003 | Hermes | C09D 5/004 428/447 |
| 2013/0052454 A1 | 2/2013 | Donovan et al. | |
| 2015/0011695 A1 | 1/2015 | Bohling et al. | |

OTHER PUBLICATIONS

Matyjjaszewski Radical Polymerization, 2002, pp. 854-8956.
Gonzalez, et al; Progress in Organic Coatings 61 (2008), pp. 38-44.

* cited by examiner

*Primary Examiner* — Cheng Yuan Huang
(74) *Attorney, Agent, or Firm* — Reid S. Willis

(57) ABSTRACT

The present invention relates to a composition comprising an aqueous dispersion of submicron-sized polymer particles and micron-sized polymer beads, wherein the polymer particles or beads or both are functionalized with phosphorus acid groups. The composition of the present invention is useful for providing a matte finish on substrates, such as leather, textiles, wallboard, decorative coatings, concrete, and wood, with improved stain resistance. The present invention also relates to a leather substrate coated with a clear matte finish comprising an acrylic or styrene-acrylic polymer film and micron-sized polymer beads, wherein the film or the beads or both are functionalized with a phosphorus acid monomer.

19 Claims, No Drawings

PHOSPHORUS ACID FUNCTIONALIZED COATING COMPOSITION

BACKGROUND OF THE INVENTION

The present invention relates to a phosphorus acid functionalized coating composition comprising a stable aqueous dispersion of polymer particles (a latex) and micron-sized polymeric beads.

Leather upholstered automotive seats and furniture coated with light toned pigments tend to readily display stains created by users of the article. Stains transfer from an occupant's clothing to the upholstered article at the point of the contact between the clothing and the article. The contact point between the occupant's clothing and the leather article is a clear topcoat that is applied to the leather as a thin film, typically between 5 µm to 30 µm in thickness, and is a first line of defense for protection of the upholstered article against stains. It is most desirable that the topcoat resist the transfer of stain to avoid the need for abrasive cleaning, which tends to deteriorate the topcoat. Accordingly, it would desirable in the field of coatings for a variety of substrates including leather, textiles, and wood to find a topcoat composition that makes cleaning of these substrates easier.

SUMMARY OF THE INVENTION

The present invention addresses a need in the art by providing, in one aspect, a composition comprising an aqueous dispersion of 1) polymer particles having an average particle size of from 50 to 300 nm; and b) polymer beads having an average particle size of from 2 to 30 µm; wherein the polymer particles or the polymer beads or both comprise from 0.1 to 5 weight percent structural units of a phosphorus acid monomer.

In a second aspect, the present invention is an article comprising a leather substrate coated with clear matte finish comprising an acrylic or styrene-acrylic polymer film and polymer beads having an average particle size of from 2 to 30 µm; wherein the acrylic or styrene-acrylic polymer film or the polymer beads or both comprise from 0.1 to 5 weight percent structural units of a phosphorus acid monomer. The composition of the present invention is useful for providing a matte finish on substrates, such as leather, textiles, wallboard, decorative coatings, concrete, and wood, with improved stain resistance.

DETAILED DESCRIPTION OF THE INVENTION

The present invention addresses a need in the art by providing, in one aspect, a composition comprising an aqueous dispersion of 1) polymer particles having an average particle size of from 50 to 300 nm; and b) polymer beads having an average particle size of from 2 to 30 µm; wherein the polymer particles or the polymer beads or both comprise from 0.1 to 5 weight percent structural units of a phosphorus acid monomer.

The term "structural unit" is used herein to describe the remnant of the recited monomer after polymerization. For example, a structural unit of methyl methacrylate is as illustrated:

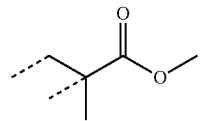

structural unit of
methyl methacrylate where the dotted lines represent the points of attachment of the structural unit to the polymer backbone.

Similarly, a structural unit of phosphoethyl methacrylate is as illustrated:

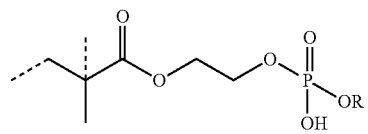

structural unit of phosphoethyl methacrylate where R is H or

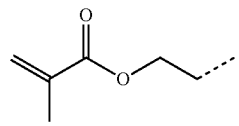

The composition of the present invention is advantageously prepared by combining separately synthesized aqueous dispersions of polymer beads and polymer particles. The aqueous dispersion of beads can be prepared by a variety of methods such as those disclosed in US Pat. Pub. 2013/0052454; U.S. Pat. Nos. 4,403,003; 7,768,602; and 7,829,626. The aqueous dispersion of beads is preferably prepared by multistep thermal polymerization using a gradual addition process.

In the first step of a preferred process, a surfactant, a suspension stabilizing agent, and water are combined with a) an oil soluble initiator; b) first monomers comprising one or more first monoethylenically unsaturated acrylate monomers that form a film-forming polymer at 25° C., by ASTM-D2354-98 (that is, low $T_g$ monomers); and c) optionally a multiethylenically unsaturated monomer. The surfactant is preferably an anionic surfactant such as the sodium salt of a $C_{10}$-$C_{14}$ alkylbenzene sulfonate. Examples of suitable suspension stabilizing agents include hydroxyethyl cellulose (HEC), polyvinyl pyrrolidone (PVP), and gelatin; examples of suitable oil soluble initiators include lauroyl peroxide (LPO) and benzoyl peroxide (BPO); examples of suitable first monoethylenically unsaturated acrylate low $T_g$ monomer or monomers include butyl acrylate, ethyl acrylate, and 2-ethylhexyl acrylate, and combinations thereof. Preferably, a multiethylenically unsaturated monomer such as allyl methacrylate, trimethyolpropane triacrylate, trimethyolpropane trimethacrylate, or divinyl benzene is also copolymerized in this first step.

More preferably, surfactant, HEC at a concentration of preferably from 0.2, more preferably from 0.5 weight percent, to preferably 5, more preferably to 3 weight percent based on the weight of total monomer, and water are combined in the first step with a) lauroyl peroxide or benzoyl peroxide; b) butyl acrylate or 2-ethylhexyl acrylate or a combination thereof; and c) allyl methacrylate, wherein the weight-to-weight ratio of butyl acrylate or 2-ethylhexyl acrylate or a combination thereof to allyl methacrylate is in the range of from 99:1, more preferably from 98:2, to preferably 92:8, more preferably to 94:6.

The first monomer or monomers are emulsified and polished, then thermally polymerized by gradual addition as follows: A mixture of water, surfactant, rheology modifier, and the polished emulsion are fed to a reactor and heated and maintained at 75° C. to 90° C. for a sufficient time to polymerize the first monomer or monomers; thereafter, one or more second monomers comprising one or more second monoethylenically unsaturated acrylate or styrenic monomers are added, either neat or in the form of an emulsion. The second monoethylenically unsaturated monomer or monomers preferably comprise a monomer which, when polymerized, is not film forming at 25° C., by ASTM-D2354-98 (that is, high $T_g$ monomers). Examples of suitable preferred second monoethylenically unsaturated monomers include styrene and methyl methacrylate. Preferably, the second monomers comprise a) styrene or methyl methacrylate or a combination thereof; and b) a phosphorus acid monomer, preferably phosphoethyl methacrylate. Most preferably, the second monomers comprise methyl methacrylate and phosphoethyl methacrylate at a weight-to-weight ratio 99.5:0.5, and more preferably from 99:1, to 92:8, more preferably to 94:6, and most preferably from 96:4.

The ratio of the first monomer or monomers to the second monomer or monomers is preferably in the range of from 1:1, and more preferably from 2:1, to 10:1, more preferably to 8:1, and most preferably to 6:1. The polymer beads preferably have a hard domain, characterized by a $T_g$ greater than 40° C., as calculated by the Fox equation, and a soft domain, characterized by a $T_g$ of less than 25° C., as calculated by the Fox equation. Preferably the weight-to-weight ratio of the soft to the hard domains is from 1:1, and more preferably from 2:1, to 10:1, and more preferably to 8:1. More preferably, the hard domain is functionalized with phosphorus acid groups.

The resultant polymer beads have an average particle size of from 2, and more preferably from 5 μm, to 30, more preferably to 20, and most preferably to 15 μm as measured by a Malvern Mastersizer 2000 Analyzer equipped with a 2000 uP module.

The stable aqueous dispersion of polymer particles (the latex) used in the composition of the present invention is preferably an acrylic or a styrene-acrylic latex, which can be conveniently prepared by emulsion polymerization. The latex can be prepared in a single stage or multiple stages and is preferably prepared in a 2-stage process. In an example of a preferred 2-stage process, a phosphorus acid monomer, preferably phosphoethyl methacrylate, is emulsion polymerized in a first stage with a low $T_g$ monomer, preferably ethyl acrylate, butyl acrylate, or 2-ethylhexyl acrylate, and, optionally, a carboxylic acid monomer such as acrylic acid or methacrylic acid under conditions sufficient to form the aqueous dispersion of first stage polymer particles.

Preferably, the concentration of the phosphorus acid monomer in this first stage is preferably from 0.1, and more preferably from 0.2 weight percent, to preferably 5, and more preferably to 3 weight percent based on the weight of first stage monomers. A carboxylic acid monomer is preferably used at a concentration of from 0.1, and more preferably from 0.2 weight percent, to preferably 8, more preferably 5 weight percent, based on the weight of first stage monomers. The low $T_g$ monomer, preferably butyl acrylate or 2-ethylhexyl acrylate, is preferably present at a concentration of from 30, and more preferably from 40 weight percent, to preferably 99.9, more preferably to 99, and most preferably to 97 weight percent, based on the weight of total first stage monomers.

In an example of a preferred second stage, a high $T_g$ monomer, preferably methyl methacrylate, styrene, or butyl methacrylate, more preferably methyl methacrylate or styrene, is combined with the stable aqueous dispersion of first stage polymer particles under emulsion polymerization to form the 2-stage aqueous dispersion of polymer particles. The dispersion of polymer particles is preferably film-forming at less than or equal to 25° C., more preferably less than or equal to 20° C. and preferably greater than or equal to −60° C., and more preferably greater than or equal to −30° C.

In another example of a preferred 2-stage process for preparing the aqueous dispersion of polymer particles, a high $T_g$ monomer is emulsion polymerized in a first stage with a low $T_g$ monomer and optionally low levels (~0.1 to 1 weight percent) of a carboxylic acid monomer and a multiethylenically unsaturated monomer to form an aqueous dispersion of a first stage monomer. The concentration of the low $T_g$ monomer is preferably from 40 to 50 weight percent, and the concentration of the high $T_g$ monomer is from 50 to 60 weight percent, based on the weight of monomers in the first stage.

In a second stage, similar concentrations of high and low $T_g$ monomers as used in the first stage are emulsion polymerized, preferably in the presence of a phosphorus acid monomer, preferably phosphoethyl methacrylate to form the 2-stage aqueous dispersion of the polymer particles. The concentration of the phosphorus acid monomer in this embodiment is preferably in the range of from 0.1, more preferably from 0.3 weight percent to 5, more preferably to 3 weight percent, based on the weight of monomers in the second stage.

The average particle size of the polymer particles is from 50, and more preferably from 80 nm, to 300, and more preferably to 250 nm as measured using a Brookhaven B190 particle analyzer.

It is critical that either the polymer beads or the polymer particles are functionalized with phosphorus acid groups, and it is preferred that both the polymer beads and the polymer particles are functionalized with phosphorus acid groups. The polymer particles preferably are functionalized with from 0.1, and more preferably from 0.2 weight percent, more preferably from 0.3 weight percent, to preferably 5, more preferably to 4, and most preferably to 3 weight percent structural units of a phosphorus acid monomer, based on the weight of the polymer particles. Similarly, the beads are preferably functionalized with preferably from 0.1, more preferably from 0.2, more preferably from 0.3, and most preferably from 1 weight percent, to preferably 5, and more preferably to 3 weight percent structural units of a phosphorus acid monomer, based on the weight of the polymer beads.

The weight-to-weight ratio of polymer beads to polymer particles is preferably from 10:90, more preferably from 30:70, and most preferably from 40:60 to preferably 80:20, more preferably 70:30, and most preferably to 60:40.

The aqueous dispersions of polymer beads and polymer particles are combined to form the composition of present invention. The composition may further include one or more ancillary materials including rheology modifiers, flow agents, coalescents, feel modifiers, defoamers, crosslinking agents, and surfactants. Although pigments may also be included, it is preferred that the composition contains a substantial absence of pigments, that is, less than 4, preferably less than 1, more preferably less than 0.1, and most preferably 0 weight percent of pigments, based on the weight of the composition.

The composition of the present invention is useful as a matte coating, preferably a clear matte coating, for a variety of substrates including leather, textiles, metal, concrete, and wood. It has been surprisingly discovered that coated substrates prepared from the compositions of the present invention, particularly coated leather substrates, exhibit improved stain resistance as compared with coatings prepared from compositions comprising polymer particles and polymer beads that are not functionalized with phosphorus acid groups.

In another aspect, the present invention is an article comprising a leather substrate coated with clear matte finish comprising a) an acrylic or styrene-acrylic polymer film; and b) polymer beads having an average particle size of from 2 to 30 µm; wherein the acrylic or styrene-acrylic polymer film or the polymer beads or both, comprise from 0.1, preferably from 0.2 weight percent to 5, preferably to 3 weight percent structural units of a phosphorus acid monomer. More preferably, the polymer beads and the polymer film are both functionalized with structural units of a phosphorus acid monomer. Preferably the particle size of the polymer bead is from 5 µm, to preferably 20, and more preferably to 15 µm as measured by a Malvern Mastersizer 2000 Analyzer equipped with a 2000 uP module.

| Abbreviations | Chemical Name |
| --- | --- |
| HEC | CELLOSIZE ™ QP-3L Hydroxyethyl Cellulose |
| PEM | Phosphoethyl methacrylate (60% active) |
| ALMA | Allyl methacrylate |
| 2-EHA | 2-Ethylhexyl acrylate |
| MMA | Methyl methacrylate |
| MAA | Methacrylic acid |
| AAEM | Acetoacetoxy ethyl methacrylate |
| BA | Butyl Acrylate |
| AA | Acrylic Acid |
| A-16-22 | Polystep A-16-22 Surfactant |
| B5N | Polystep B5N Surfactant |
| Lauroyl Peroxide | Luperox LP organic initiator |
| t-BHP | t-Butyl hydroperoxide (70% in water) |
| APS | Ammonium persulfate |
| IAA | Isoascorbic acid |
| FF6M | Bruggolite FF6M Reducing Agent |
| SSF | Sodium formaldehyde sulfoxylate |
| EC-3085A | 4-Hydroxytempo antioxidant (5% in water) |
| 1.5LX | KATHON ™ 1.5LX Biocide |
| RM-825 | ACRYSOL ™ RM-825 Rheology Modifier |
| RM-8W | ACRYSOL ™ RM-8W Rheology Modifier |
| RM-2020 | ACRYSOL ™ RM-2020 Rheology Modifier |
| 2229W | ROSILK ™ 2229W Feel Modifier |
| Fluid H | Aquaderm Fluid H flow agent |
| Laponite | Laponite RD (2.7% in deonized water) |
| Texanol | Texanol coalescent |
| BYK-022 | BYK-022 defoamer |
| CF-10 | TRITON ™ CF-10 surfactant |

(CELLOSIZE, KATHON, ROSILK, ACRYSOL, and TRITON are all Trademarks of The Dow Chemical Company or its Affiliates);

Method for Measuring Particle Size Distribution in Polymer Beads

Particle size distributions of beads were determined using light diffraction a Malvern Mastersizer 2000 Analyzer equipped with a 2000 uP module. Approximately 0.5 g of bead dispersion samples were pre-diluted into 5 mL of 0.2 weight percent active Triton 405 in degassed, DI water (diluents). The pre-diluted sample was added drop-wise to the diluent filled 2000 uP module while the module was pumped at 1100 rpm. Red light obscurations were targeted to be between 4 and 8%. Samples were analyzed using a Mie scattering model (particle real refractive index of 1.48 and absorption of zero: Diluent real refractive index of 1.330 with absorption of zero). A general purpose (spherical) analysis model with "normal sensitivity" was used to analyze the diffraction patterns and convert them into particle size distributions.

Intermediate Example 1

Preparation of Large Particle Sized Bead Containing 4% PEM

Preparation of the Monomer Emulsion:

A mixture of A-16-22 (4.24 g), HEC (13.2 g), and DI water (800 g) was combined with stirring with a mixture of ALMA (21.3 g), 2-EHA (511.25 g), and lauroyl peroxide (3.04 g) in a 5-L vessel and emulsified using a Polytron PT10-35 rotor-stator homogenizer with a PCU-11 controller. The resultant emulsion was polished for 1 min with the controller's power at setting 2, thermally polymerized under gradual-addition conditions.

Thermal Polymerization Using a Gradual Addition Process:

A mixture of DI water (350 g) and EC-3085A (0.11 g) was added to a reactor and the contents heated to 80° C. The stage 1 polished emulsion was fed to the reactor over 1 h. Upon completion of the feed, the reactor was held at 80° C. for about 30 min, after which time a stage 2 emulsion consisting of MMA (127.4 g) and PEM (5.3 g, 60% active) was then fed into the reactor over 45 min. The reaction temperature was held at 80° C. for 15 min then cooled to 65° C., whereupon a solution of ferrous sulfate (7 g, 0.15% aqueous) and VERSENE EDTA (1.0 g, 1.0% aqueous) were added to the reactor. t-BHP (4 g) dissolved in water (20 mL) and IAA (2 g) dissolved in water (20 mL) were fed separately into the reactor over 30 min, after which time the reactor was allowed to cool to room temperature. The resulting emulsion was then filtered through a 100-mesh screen. Particle Size was measured at 8.8 µm; percent solids was 33.4% with a gel number of 170 ppm.

Intermediate Example 2

Preparation of Large Particle Sized Bead Containing 2% PEM

This intermediate was prepared substantially as described for Intermediate Example 1 except that the ratio of MMA to PEM was 98:2 and the w/w ratio of Stage 1 to Stage 2 was 80.4/19.6. Particle Size was measured at 16.4 µm; percent solids was 34.6% with a gel number of 182 ppm. Differences in particle sizes observed were believed to be due to differences in homogenization power input and time.

Intermediate Examples 3 and 4

Preparation of Large Particle Sized Bead without any Phosphorus Acid Functionalization These intermediates were prepared using substantially the same procedure described for the preparation of Intermediate Example 1 except for differences in the monomer profile, as reflected in Table 1. In each instance, the beads were not functionalized with phosphorus acid groups. In Table 1, Stg 1 and Stg 2 refer to the compositions of the first and second stages of the beads, respectively. In each case, the ratio of Stage 1 to Stage 2 beads was ~80:20.

TABLE 1

Bead Compositions and Particle Sizes

| Int. Ex. # | 1 | 2 | 3 | 4 |
|---|---|---|---|---|
| Stg 1 | 96 EHA/4ALMA | 96 EHA/4 ALMA | 96 BA/4ALMA | 98 EHA/2ALMA |
| Stg 2 | 97.6 MMA/2.4 PEM | 98 MMA/1.2 PEM | 96 MMA/4 EA | 100 MMA |
| PS (μm) | 8.8 | 16.4 | 4.5 | 9.4 |

Intermediate Example 5

Preparation of PEM-Containing Latex

Monomer Emulsion 1 (ME1) was prepared by mixing water (200.9 g), B5N (23.3 g), A-16-22 (23.3 g), BA (598.45 g), AA (21.75 g), and PEM (3.9 g); Monomer Emulsion 2 (ME2) was prepared by mixing water (10 g) and MMA (155.03 g).

Water (757.5 g) was added to a four-neck 5-L round bottom flask equipped with a mechanical paddle stirrer, a thermocouple, $N_2$ inlet, and reflux condenser. The water was purged with $N_2$ and heated to 35° C., whereupon ME1 (213.54 g) was added with stirring. After 1 min, aqueous solutions of iron sulfate heptahydrate (0.01 g in 2.5 g water), APS (0.16 g in 15 g water), and sodium dithionite (0.31 g in 15 g water) were added sequentially to the flask and the mixture was allowed to exotherm to 55° C. and maintained at 55° C. for 5 min. The mixture was cooled to 48° C., whereupon EC-3085A (2.55 g), the remainder of ME1, aqueous solutions of APS (0.46 g in 15 g water), and sodium dithionite (0.78 g in 15 g water) were added sequentially to the flask. The contents of the flask were allowed to exotherm to 74° C. and maintained at 74° C. for 10 min, at which time aqueous solutions of t-BHP (0.35 g in 5 g water) and SSF (0.28 g in 15 g water) were added sequentially to the flask. After a 5-min hold, the mixture was cooled to 64° C., at which time ME2, aqueous solutions of t-BHP (0.71 g in 7.5 g water), and FF6M (0.54 g in 15 g water) were added sequentially to the flask. The contents of the flask were allowed to exotherm to 74° C. and controlled at 74° C. for 15 min, after which time aqueous solutions of t-BHP (1.17 g in 17.5 g water) and FF6M (1.02 g in 20 g water) were added sequentially at rates of 0.62 g/min respectively 0.7 g/min with concomitant cooling to 30° C. B5N (55.42 g) and an aqueous solution of triethylamine (14.35 g in 125 g water) were added to the cooled flask at a rate of 4.27 g/min followed by addition of an aqueous solution of hydrogen peroxide (0.63 g in 5 g water), then an aqueous solution of 1.5 LX (2 g in 2.5 g water) at a rate of 0.45 g/min. After completion of the feeds, the contents of the flask were filtered to remove any gel. The filtered dispersion was found to have a solids content of 34.7%, negligible gel, and a pH of 7.2.

Intermediate Examples 6, 7 and 8 were prepared substantially by the same procedure as described for Intermediate Example 3, except differences in monomer profile as reflected in Table 2.

In Table 2, Stg 1 Comp and Stg 2 Comp refer to the compositions of the monomers used in the first and second stages to prepare the latexes. Stg 1:Stg 2 refers to the ratio (w/w) of Stage 1 to Stage 2 monomers.

TABLE 2

Latex compositions

| Int. Ex. # | 5 | 6 | 7 | 8 |
|---|---|---|---|---|
| Stg 1 Comp | 96 BA/0.3 PEM/ 3.5 AA | 94.5 BA/1.2 PEM/ 3.5 AA | 45 BA/54.1 MMA/ 0.4 MAA/0.5 ALMA | 96.5 BA/3.5 AA |
| Stg 2 Comp | 100 MMA | 100 MMA | 45 BA/43.5 MMA/3 PEM/ 1 MAA/7.5 AAEM | 100 MMA |
| Stg 1:Stg 2 | 80/20 | 80/20 | 40/60 | 80/20 |

Formulation preparation: Using a 0.25-L plastic container and a 3-blade pitched metal stirrer, the materials listed in Table 3 were added in the order listed and mixed for at least 5 min after all materials were added. Int. Ex. refers to intermediate example, C1 refers to comparative example 1, and C2 refers to comparative example 2. All numbers in Table 3 represent weights in grams.

TABLE 3

Pigment free topcoat formulations

| | Example No. | | | | | |
|---|---|---|---|---|---|---|
| | 1 | 2 | 3 | 4 | C1 | C2 |
| Int. Ex. 6 | 84.7 | 84.7 | | | | |
| Int. Ex. 7 | | | 103.92 | 103.92 | | |
| Int. Ex. 8 | | | | | 84.7 | 84.7 |
| RM-825 | 0.48 | 0.48 | | | 0.48 | 0.48 |
| Fluid H | 3.14 | 3.14 | | | 3.14 | 3.14 |
| 2229w | 3.76 | 3.76 | | | 3.76 | 3.76 |
| RM-825 | 0.48 | 0.48 | | | 0.48 | 0.48 |
| Int. Ex. 1 | | 41.3 | | | | |
| Int. Ex 2 | 38.8 | | 57.0 | | | |
| Int. Ex. 3 | | | | | | 41.98 |
| Int. Ex. 4 | | | | 57.0 | 39.5 | |
| Laponite | 22.2 | 22.2 | | | 22.2 | 22.2 |
| dilution water | 39 | 37.1 | 26.72 | 26.72 | 39 | 36.3 |
| RM-825 | 7.5 | 7.3 | | | 6.7 | 7 |
| Texanol | | | 3.15 | 3.15 | | |
| Byk-022 | | | 0.62 | 0.62 | | |
| CF-10 | | | 0.53 | 0.53 | | |
| RM-8W | | | 3.22 | 3.22 | | |
| RM-2020 | | | 4.84 | 4.84 | | |
| Total (g) | 200.0 | 200.0 | 200.0 | 200.0 | 200.0 | 200.0 |

Stain Testing Procedure:

Topcoats were cast onto a white vinyl Leneta chart with a 7-mil Dow latex applicator and dried for 7 d in a CTR (72° F. (~22° C.), 50% R.H.). After 7 d, a number of ½-inch (1.2-cm) sections were marked across the test panels equal to the number of stains to be tested. The stains were placed in the test areas for 1 h. The tested stains included tea, grape juice, coffee, and red wine. After 1 h, excess stains were removed using Kimwipes wipers and the test panel was placed on a Abrasion Tester (washability machine). A household sponge was loaded with 10 mL of non-abrasive scrub media (Leneta) and 15 mL of water. The sponge was placed in a 1-lb (0.45 Kg) abrasion boat and 200 cycles were completed using the abrasion tester. After cycles were completed the test panels were rinsed, allowed to dry and then rated based on the percent stain removal: (1=10% through 10=100% stain removal).

Table 4 illustrates the Results of Hydrophilic Stain Resistant Tests for the Examples and Comparative Examples

TABLE 4

Hydrophilic Stain Resistance Results

| | Ex. No. | | | | | |
|---|---|---|---|---|---|---|
| | 1 | 2 | 3 | 4 | C1 | C2 |
| PEM in latex? | Yes | Yes | Yes | Yes | No | No |
| PEM in Bead? | Yes | Yes | Yes | No | No | No |
| Stain results | | | | | | |
| Tea | 7 | 7 | 8 | 6 | 2 | 2 |
| Coffee | 9 | 9 | 9 | 7 | 5 | 5 |
| Redwine | 6 | 6 | 7 | 5 | 2 | 2 |
| Grapejuice | 7 | 7 | 7 | 5 | 4 | 4 |

Rating of 1-10 in which 10 represents complete stain removal.

The results demonstrate a dramatic improvement in stain resistance for the compositions that contain latex binder and bead both functionalized with PEM (Examples 1-3) and even a measurable improvement across the board for a composition that contains PEM in the latex binder only (Example 4) as compared with compositions that contain no phosphorus acid functionalization in either the latex binder or the beads (Comparative Examples 1 and 2).

The invention claimed is:

1. A composition comprising an aqueous dispersion of 1) polymer particles having an average particle size of from 50 to 300 nm; and b) polymer beads having an average particle size of from 2 to 30 μm; wherein the polymer particles and the polymer beads comprise from 0.1 to 5 weight percent structural units of a phosphorus acid monomer.

2. The composition of claim 1 wherein the weight-to-weight ratio of polymer beads to polymer particles is from 10:90 to 80:20, and the polymer particles have an average particle size in the range of from 80 to 300 nm.

3. The composition of claim 2 wherein the polymer beads comprise a hard phase and a soft phase, wherein the weight-to-weight ratio of the soft phase to the hard phase is from 1:1 to 10:1, wherein the weight-to-weight ratio of polymer beads to polymer particles is from 30:70 to 70:30.

4. The composition of claim 3 wherein the soft phase of the polymer beads comprises structural units of a crosslinking agent.

5. The composition of claim 4 wherein the polymer particles are film-forming at less than or equal to 25° C. and greater than or equal to −60° C.

6. The composition of claim 5 wherein the phosphorus acid monomer is phosphoethyl methacrylate, wherein the composition further comprises a substantial absence of pigments.

7. The composition of claim 6 which comprises less than 1 weight percent of pigments, wherein the polymer beads and polymer particles are each functionalized with from 0.2 to 3 weight percent structural units of phosphoethyl methacrylate.

8. The composition of claim 7 wherein the composition comprises less than 0.1 weight percent of pigments and further comprises a rheology modifier, a coalescent, a defoamer, and a surfactant.

9. The composition of claim 8 wherein the weight-to-weight ratio of polymer beads to polymer particles is from 30:70 to 70:30; wherein the polymer beads comprise a hard phase and a soft phase, wherein the weight-to-weight ratio of the soft phase to the hard phase is from 1:1 to 10:1.

10. The composition of claim 1 which further comprises a suspension stabilizing agent which is hydroxyethyl cellulose, polyvinyl pyrrolidone, or gelatin.

11. An article comprising a leather substrate coated with clear matte finish comprising an acrylic or styrene-acrylic polymer film and polymer beads having an average particle size of from 2 to 30 μm; wherein the acrylic or styrene-acrylic polymer film and the polymer beads comprise from 0.1 to 5 weight percent structural units of a phosphorus acid monomer.

12. The article of claim 11 wherein the acrylic or styrene-acrylic polymer film and the polymer beads comprise from 0.1 to 5 weight percent structural units of phosphoethyl methacrylate.

13. The article of claim 12 wherein the acrylic or styrene-acrylic polymer film and the polymer beads comprise from 0.2 to 3 weight percent structural units of phosphoethyl methacrylate.

14. A composition comprising an aqueous dispersion of 1) polymer particles having an average particle size of from 50 to 300 nm; and b) polymer beads having an average particle size of from 5 μm to 30 μm; wherein the polymer particles and the polymer beads each comprise structural units of a phosphorus acid monomer; wherein the polymer particles are film-forming at less than or equal to 20° C. and greater than or equal to −60° C.

15. The composition of claim 14 wherein the polymer particles are acrylic or styrene-acrylic polymer particles that comprise from 0.1 to 5 weight percent structural units of the phosphorus acid monomer, and the polymer beads comprise a hard domain having a $T_g$ greater than 40° C. and a crosslinked soft domain having a $T_g$ less than 25° C., wherein:
   a) the weight-to-weight ratio of the soft domain to the hard domain is from 1:1 to 10:1;
   b) the hard domain is functionalized with structural units of I) the phosphorus acid monomer; and II) methyl methacrylate or styrene or a combination thereof at II:I ratio in the range of from 99.5:0.5 to 94:6.

16. The composition of claim 15 wherein the soft domain of the polymer beads comprises structural units of butyl acrylate or 2-ethylhexyl acrylate or a combination thereof; and allyl methacrylate.

17. The composition of claim 16 wherein the weight-to-weight ratio of structural units of butyl acrylate or 2-ethylhexyl acrylate, or a combination thereof, to allyl methacrylate is in the range of from 99:1, to 92:8.

18. The composition of claim 17 wherein the polymer particles further comprise, based on the weight of the polymer particles; from 40 to 99 weight percent structural units of butyl acrylate or 2-ethylhexyl acrylate; and styrene or methyl methacrylate.

19. The composition of claim 14 wherein the phosphorus acid monomer is phosphoethyl methacrylate and the composition comprises less than 0.1 weight percent of pigments.

* * * * *